Figures 1, 2:
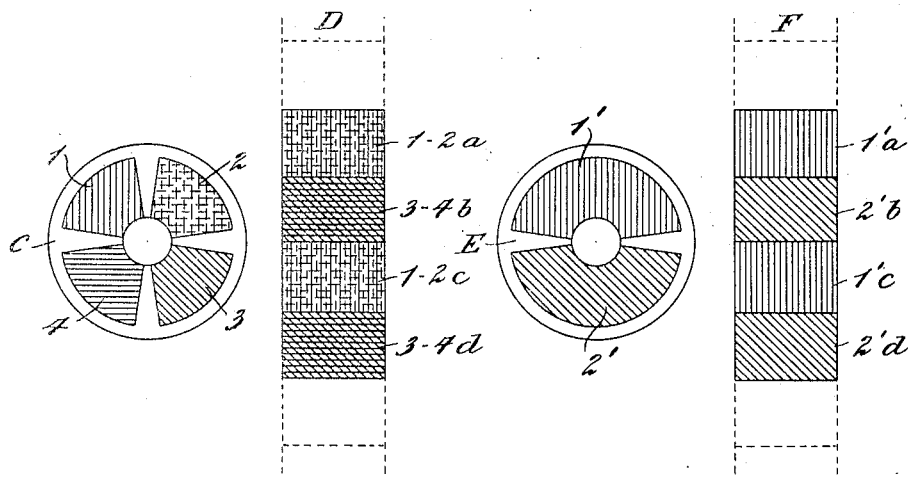

M. J. WOHL & M. MAYER.
COLOR PHOTOGRAPHY.
APPLICATION FILED DEC. 29, 1914.

1,211,904.

Patented Jan. 9, 1917.

UNITED STATES PATENT OFFICE.

MAURICE J. WOHL, OF BROOKLYN, AND MAX MAYER, OF NEW YORK, N. Y., ASSIGNORS, BY MESNE ASSIGNMENTS, TO PRIZMA INCORPORATED, A CORPORATION OF VIRGINIA.

COLOR PHOTOGRAPHY.

1,211,904.      Specification of Letters Patent.      Patented Jan. 9, 1917.

Original application filed October 15, 1913, Serial No. 795,244. Divided and this application filed December 29, 1914. Serial No. 879,442.

*To all whom it may concern:*

Be it known that we, MAURICE J. WOHL, a citizen of the United States, and resident of the borough of Brooklyn, county of Kings, and State of New York, and MAX MAYER, a citizen of the United States, and resident of the city, county, and State of New York, have invented certain new and useful Improvements in Color Photography, of which the following is a specification.

This invention relates to the art of producing photographic pictures in natural colors in a motion picture machine.

This application is a division of our application filed Oct. 15, 1913, Ser. No. 795,244 which was allowed July 9, 1914, Patent No. 1,122,455, issued Dec. 29, 1914.

The object of this invention is to provide means for re-producing color values in the projected positive picture more perfectly and completely than is possible with any other known methods.

In carrying out the invention we can either employ the principle of persistence of vision or the superposing of different color values or colors.

The particular feature of our invention forming the subject of this application consists in the use of a color screen arranged in either two sets or two sections, each set or section composed of balanced complementary colors different from the colors of the other set, so that the screen covers a much wider range of the spectrum than is possible with any two or three color combinations. This screen is used in connection with a film on which the pictures are arranged in groups of four different color values. This arrangement avoids the extreme amount of flicker, by reason of the fact that the color sensations produced by one set overlap those of the other set, the second set extending the sensations over a different section of the spectrum. If the spectrum were merely divided into four parts upon four screens and projected consecutively, in the order of the spectrum, it would be necessary to maintain a very high speed in order to obtain the color effects by persistence of vision and, furthermore, as any one of the colors, such as bright red, would only occur in every fourth projection or picture, there would result an abnormal amount of flicker.

With our improved arrangement of the screen in sets, each set composed of balanced complementary colors, it is possible to distribute the color sensations in such a manner that the colors weakly produced by one section of the screen are strengthened by the corresponding stronger colors of the other section and, at the same time, the range of the colors is extended over practically the whole spectrum.

The screen used for producing motion picture negative films is arranged with four color values and moved so that each impresses its color value upon one picture, the entire screen impressing the four color values upon four successive pictures. In the projection of the pictures the screen heretofore described is moved in connection with the film so that the two sets or sections alternately operate in connection with the successive pictures and the entire range of colors is thus reproduced in four succeeding pictures or film areas. The persistence of vision is sufficiently strong to cause the color sensations to overlap, and, on account of the arrangement of the film and screen above described, the colors are reproduced not only in a wider range but with exceedingly soft graduations of tone and absence of flicker. This permits the screen to be made of greater luminosity and reduces the eye strain on account of the gradual blending of the colors.

Balanced colors are complementary colors of like photographic density which produce white when combined in equal proportions. Complementary colors are colors which produce white, when combined, but which may be of unequal density, and usually are so. By the term "balanced" we mean that when exposure on a panchromatic film is made through the balanced complementary colors for an equal length of time with a given intensity of light, the records of white objects give an equal intensity of image.

The method of projection by the persistence of vision is by presenting consecutively the four color value pictures through a two color screen, one color serving the odd number of the positive series picture, the other color serving the even numbers, each projecting screen having its colors chosen from a combination of the set of colors used in the taking screens. In this case, although the four colored positive is only served by a two color screen, the extended range of color impressions gathered by the four colored negative is to a large extent reproduced by the two color projection screen, when the latter has its colors chosen for this purpose, each set of colors of the projecting screen being composed of a color which is a combination of the first colors in each set in the one case and the second colors in each set in the second case, such as red and orange in one set and green and blue in the second set.

Figure 1 shows a revolving projecting color screen C formed in two sets, the first set 1 and 2 which operates in connection with the first picture 1—2ª of the film D and the second set 3 and 4 which operates in connection with the second picture 3—4ᵇ on the film, the revolving screen C having made one complete revolution for these two pictures. In the second revolution pictures 1—2ᶜ and 3—4ᵈ are served in the same manner. As an example of the colors, the section 1 may be red, section 2 orange-yellow, section 3 green-blue and section 4 blue-violet. Fig. 2 shows the projecting color screen E composed of two sections or colors, 1' and 2', the first section 1' serves the first picture 1'ª of film F, the second section 2' serves the second picture 2'ᵇ, then the first section 1' again comes into operation and serves the third picture 1'ᶜ, and the second section 2' serves the fourth picture 2'ᵈ.

It will be understood that the screen used in projecting the pictures is composed of two sets of colors, in which each set may be arranged in two or more separate sections as in Fig. 1, or may be composed of two sections, as in Fig. 2, in which the first section is a combination of the first set and the second section is a combination of the second set of Fig. 1.

What we claim is—

1. In motion picture projection apparatus, in combination with a film on which the series of pictures are arranged in groups of four different color values, of a screen composed of two sets of balanced complementary colors, said sets being arranged to be used alternately with a single objective in connection with the successive pictures on said film.

2. In motion picture projection apparatus, in combination with a film on which the series of pictures are arranged in groups of four different color values, of a screen composed of two sets of balanced complementary colors, the colors of one set overlapping those of the other set but extending over a different section of the spectrum, said sets being arranged to be used alternately with a single objective in connection with the successive pictures on said film.

3. In motion picture projection apparatus, means adapted to rapidly and successively present a series of pictures representing succeeding groups of four different color impressions and a two color screen of balanced complementary colors adapted to be brought into position so that the two colors alternately serve the series of pictures of corresponding color values, one color for each image, the two color screen being brought into position twice for each group of four color impressions.

4. In motion picture projection apparatus, in combination with a film on which the series of pictures are arranged in groups of four different color values, of a screen adapted to be brought into position twice for each group; each half of said screen comprised of balanced complementary colors, which combined, approximate the color-values in the pictures which they serve.

5. In motion picture projection apparatus, means adapted to rapidly and successively present a series of pictures representing succeeding groups of four different color impressions, of a screen adapted to be brought into position twice for each group, each half of said screen comprised of balanced complementary colors approximating the color values in the pictures which it serves.

6. In motion picture projection apparatus, means adapted to rapidly and successively present a series of pictures representing succeeding groups of four different color impressions, of a screen adapted to be brought into position twice for each group, each half of said screen comprised of balanced complementary colors, which combined, approximate the color values in the pictures which they serve.

7. In motion picture projection apparatus in combination with a film on which the series of pictures are arranged in groups of four different color values, of a screen adapted to be brought into position twice for each group, each half of said screen comprised of balanced complementary colors approximating the color values in the pictures which it serves.

8. A motion picture projection apparatus for producing images in substantially their natural colors, comprising a film consisting of groups of four differing color-value images, in combination with a two color screen of balanced complementary colors whose color in one half is approximately a combination of the first and third taking colors, and in the second half of the second and fourth taking colors, corresponding to the respective color values in the film, adapted to pass each group twice, one color for each image, so as to present to the eye in the blending of the colors and the images a motion picture in substantially its natural colors.

9. A motion picture projection apparatus for producing images in substantially their natural colors, in combination with a film consisting of groups of four different color value images, a screen adapted to be brought into position twice for each group, each half of said screen comprised of balanced complementary colors which, when combined, approximate the color values in the pictures which they serve, so as to present to the eye in the blending of the colors and the images a motion picture in substantially its natural colors.

Signed at Brooklyn, in the county of Kings, State of New York, this 26th day of December, 1914.

MAURICE J. WOHL.
MAX MAYER.

Witnesses:
WM. V. D. KELLEY,
ROBERT E. LOVE.